(12) United States Patent
Hakozaki (10) Patent No.: US 8,780,380 B2
(45) Date of Patent: Jul. 15, 2014

(54) INFORMATION PROCESSING APPARATUS, OUTPUT SYSTEM, AND COMPUTER-READABLE STORAGE MEDIUM TO OUTPUT STORED DATA IN A MANNER ASSOCIATED WITH SECOND USER INFORMATION THAT SPECIFIES DATA BASED ON FIRST USER INFORMATION

(71) Applicant: Hironori Hakozaki, Kanagawa (JP)

(72) Inventor: Hironori Hakozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/901,900

(22) Filed: May 24, 2013

(65) Prior Publication Data

US 2013/0258395 A1 Oct. 3, 2013

Related U.S. Application Data

(63) Continuation of application No. 12/780,003, filed on May 14, 2010, now Pat. No. 8,472,041.

(30) Foreign Application Priority Data

Jun. 1, 2009 (JP) .................................. 2009-132258

(51) Int. Cl.
*G06K 15/00* (2006.01)
*G06F 3/12* (2006.01)

(52) U.S. Cl.
USPC ................................. 358/1.14; 358/1; 358/16

(58) Field of Classification Search
USPC ........................ 358/1.1, 1.13, 1.14, 1.15, 1.18; 709/201, 203, 223, 242; 399/16; 347/14, 19; 705/29
See application file for complete search history.

(56) References Cited

U.S. PATENT DOCUMENTS

| 7,286,250 B2 | 10/2007 | Kujirai et al. |
| 7,454,796 B2 * | 11/2008 | Mazzagatte et al. ............ 726/28 |
| 8,228,537 B2 | 7/2012 | Uehara |
| 8,253,952 B2 | 8/2012 | Tsuchitoi |

(Continued)

FOREIGN PATENT DOCUMENTS

| EP | 1 217 509 A2 | 6/2002 |
| EP | 1 376 331 A2 | 1/2004 |

(Continued)

OTHER PUBLICATIONS

Extended European Search Report of EP10163364.2 dated Jan. 5, 2012.

(Continued)

*Primary Examiner* — Gabriel Garcia
(74) *Attorney, Agent, or Firm* — IPUSA, PLLC (57) ABSTRACT

An information processing apparatus receives from a client apparatus a print request including authentication information of a user, and a judging part judges whether a printing related to the print request is enabled using the authentication information, and a sending part sends to the client apparatus information indicating that printing is prohibited when the judging part judges that the printing is not enabled. A recording part records print data and print attribute information received from the client apparatus in a related manner with respect to the print request if the judging part judges that the printing is enabled, and a sending part sends the print data to an image forming apparatus in response to a request therefrom.

20 Claims, 10 Drawing Sheets

(56) References Cited

U.S. PATENT DOCUMENTS

| | | | |
|---|---|---|---|
| 8,279,474 B2 | 10/2012 | Miyamoto | |
| 8,472,041 B2 * | 6/2013 | Hakozaki | 358/1.14 |
| 2007/0146778 A1 | 6/2007 | Kitagata et al. | |
| 2010/0238501 A1 | 9/2010 | Fujimaki | |
| 2010/0293602 A1 | 11/2010 | Uchida | |
| 2011/0134466 A1 | 6/2011 | Nakagawa | |

FOREIGN PATENT DOCUMENTS

| | | |
|---|---|---|
| JP | 10-340164 | 12/1998 |
| JP | 2001-312380 | 11/2001 |
| JP | 2003-186637 | 7/2003 |
| JP | 2003-330686 | 11/2003 |
| JP | 2006-011834 | 1/2006 |
| JP | 2006-127297 | 5/2006 |
| JP | 2007-200284 | 8/2007 |
| JP | 2008-023910 | 2/2008 |

OTHER PUBLICATIONS

Japanese Office Action of JP2009-132258 mailed Feb. 12, 2013.
Japanese Office Action dated Oct. 22, 2013.

* cited by examiner

| USER NAME | CARD ID | PASSWORD |
|---|---|---|
| ... | ... | ... |
| ... | ... | ... |
| ... | ... | ... |

INFORMATION PROCESSING APPARATUS, OUTPUT SYSTEM, AND COMPUTER-READABLE STORAGE MEDIUM TO OUTPUT STORED DATA IN A MANNER ASSOCIATED WITH SECOND USER INFORMATION THAT SPECIFIES DATA BASED ON FIRST USER INFORMATION

CROSS-REFERENCE TO RELATED APPLICATIONS

This application is a Continuation Application of U.S. patent application Ser. No. 12/780,003 filed on May 14, 2010, which is based upon and claims the benefit of priority of Japanese Patent Application No. 2009-132258 filed on Jun. 1, 2009, the entire contents of which are incorporated herein by reference.

BACKGROUND OF THE INVENTION

1. Field of the Invention

The present invention generally relates to information processing apparatuses, information processing systems and computer-readable storage media, and more particularly to an information processing apparatus and an information processing system that store a print job to be executed by an image forming apparatus, and to a computer-readable storage medium that stores a program for causing a computer to store a print job to be executed by the image forming apparatus.

2. Description of the Related Art

For example, a Japanese Laid-Open Patent Publication No. 2007-200284 proposes a printing system in which a print server is provided between a client Personal Computer (PC) and an image forming apparatus. This print server stores a print job that is set from the client PC, and transfers the stored print job to the image forming apparatus depending on a request from the image forming apparatus. In the printing system having such a print server, a user first inputs a print instruction from the client PC. The client PC sends the print job in accordance with the print instruction to the print server. The print server does not immediately transfer the print job to the image forming apparatus, but stores the print job in a storage unit such as a Hard Disk Drive (HDD). Thereafter, the user operates the image forming apparatus, and instructs the printing of the print job stored in the storage unit. The image forming apparatus acquires the print job from the print server in accordance with the instruction made by the user, and carries out the printing.

In the printing system described above, it is undesirable from the point of view of security to permit printing of a print job stored in the storage unit by a user other than the user who inputted the print instruction corresponding to this print job. Hence, a user authentication process is conventionally carried out when executing the print job in the image forming apparatus. For example, when the user instructs the printing of the print job stored in the storage unit, the user inputs the user's own authentication information, and the printing of the print job instructed by the user is permitted if the authentication process based on the authentication information is successful.

However, when it is found that the printing cannot be made after the operation of the user changes from the client PC to the image forming apparatus, the user may suffer considerable consequences. In other words, the user must return to the client PC and newly instruct another image forming apparatus to execute the printing. On the other hand, in a case where the image forming apparatus is set up at a remote location such as a location where the user is dispatched, the user cannot return to the client PC, and the user cannot obtain the desired document that should have been obtained by the printing.

SUMMARY OF THE INVENTION

Accordingly, it is a general object of the present invention to provide a novel and useful, information processing apparatus, information processing system and computer-readable storage medium, in which the problems described above are suppressed.

Another and more specific object of the present invention is to provide an information processing apparatus, an information processing system, and a computer-readable storage medium, which may improve convenience of a printing system in which a print destination is not restricted when a print instruction is issued from a client computer.

According to one aspect of the present invention, there is provided an information processing apparatus comprising a print request receiving part configured to receive from a client apparatus a print request including authentication information of a user; a judging part configured to judge whether a printing related to the print request is enabled using the authentication information; a prohibit sending part configured to send to the client apparatus information indicating that printing is prohibited when the judging part judges that the printing is not enabled; a print information recording part configured to record print data and print attribute information received from the client apparatus in a related manner in a storage part with respect to the print request, if the judging part judges that the printing is enabled; and a sending part configured to send the print data to an image forming apparatus coupled to the information processing apparatus via a network, in response to a request from the image forming apparatus.

According to one aspect of the present invention, there is provided an information processing system comprising an information processing apparatus; and an image forming apparatus, said information processing apparatus comprising a print request receiving part configured to receive from a client apparatus a print request including authentication information of a user; a judging part configured to judge whether a printing related to the print request is enabled using the authentication information; a prohibit sending part configured to send to the client apparatus information indicating that printing is prohibited when the judging part judges that the printing is not enabled; a print information recording part configured to record print data and print attribute information received from the client apparatus in a related manner in a storage part with respect to the print request, if the judging part judges that the printing is enabled; and a sending part configured to send the print data to an image forming apparatus coupled to the information processing apparatus via a network, in response to a request from the image forming apparatus, said image forming apparatus comprising a print control part configured to print the print data received from the information processing apparatus.

According to one aspect of the present invention, there is provided a computer-readable storage medium on which a program which, when executed by a computer, causes the computer to perform a process comprising a print request receiving procedure causing the computer to receive from a client apparatus a print request including authentication information of a user; a judging procedure causing the computer to judge whether a printing related to the print request is enabled using the authentication information; a prohibit sending procedure causing the computer to send to the client apparatus information indicating that printing is prohibited when the judging procedure judges that the printing is not enabled; a print information recording procedure causing the computer to record print data and print attribute information received from the client apparatus in a related manner in a storage part with respect to the print request, if the judging procedure judges that the printing is enabled; and a sending procedure causing the computer to send the print data to an image forming apparatus coupled to the information processing apparatus via a network, in response to a request from the image forming apparatus.

Other objects and further features of the present invention will be apparent from the following detailed description when read in conjunction with the accompanying drawings.

DESCRIPTION OF THE PREFERRED EMBODIMENTS

A description will be given of an information processing apparatus, an information processing system, and a computer-readable storage medium in embodiments of the present invention, by referring to FIGS. 1 through 11.

Figure 1:
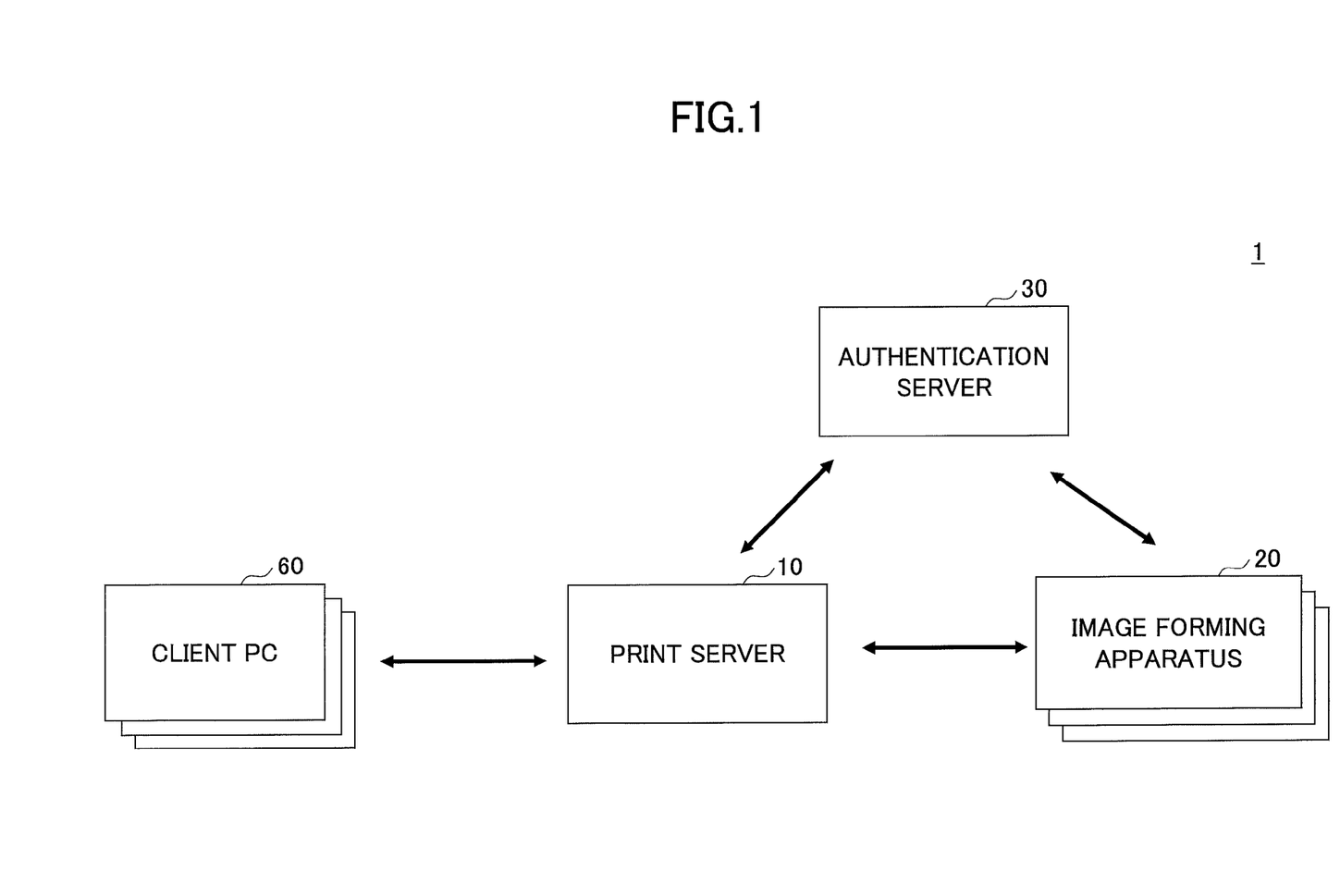
FIG. 1 is a diagram illustrating an example of a structure of a printing system in an embodiment of the present invention.

FIG. 1 is a diagram illustrating an example of a structure of a printing system in an embodiment of the present invention. A printing system 1 illustrated in FIG. 1 includes a print server 10, one or a plurality of image forming apparatuses 20, an authentication server 30, and one or a plurality of client PCs 60, that are connected via a network such as a Local Area Network (LAN) or the Internet.

The client PC 60 is formed by a computer that holds print target data (for example, document data, image data and the like) to be printed, and sends to the print server 10 a print request for the print target data (or print data) in response to a print instruction input by a user. The client PC 60 urges the user to input authentication information (for example, user name and password) when inputting the print instruction, and includes the authentication information in the print request.

The print server 10 is formed by a computer that stores the print data included in the print request received from the client PC 60. The print server 10 causes the authentication server 30 to execute an authentication process based on the authentication information included in the print request, and stores the print data included in the print request if the authentication process is successful.

The image forming apparatus 20 is formed by a printer, a Multi-Function Peripheral (MFP) or the like that is configured to acquire the print data stored in the print server 10 and to print the print data, in response to an operation or instruction made by the user. The image forming apparatus 20 urges the user to input authentication information, and causes the authentication server 30 to execute an authentication process based on the authentication information that is input. The image forming apparatus 20 acquires the print data from the print server 10 if the authentication process is successful.

The authentication server 30 is formed by a computer that executes the authentication process. In this embodiment, the authentication server 30 is used in common by the print server 10 and the image forming apparatus 20.

Of course, it is possible to provide one or a plurality of print servers 10 in the printing system 1, and it is possible to provide one or a plurality of authentication servers 30 in the printing system 1.

Figure 2:
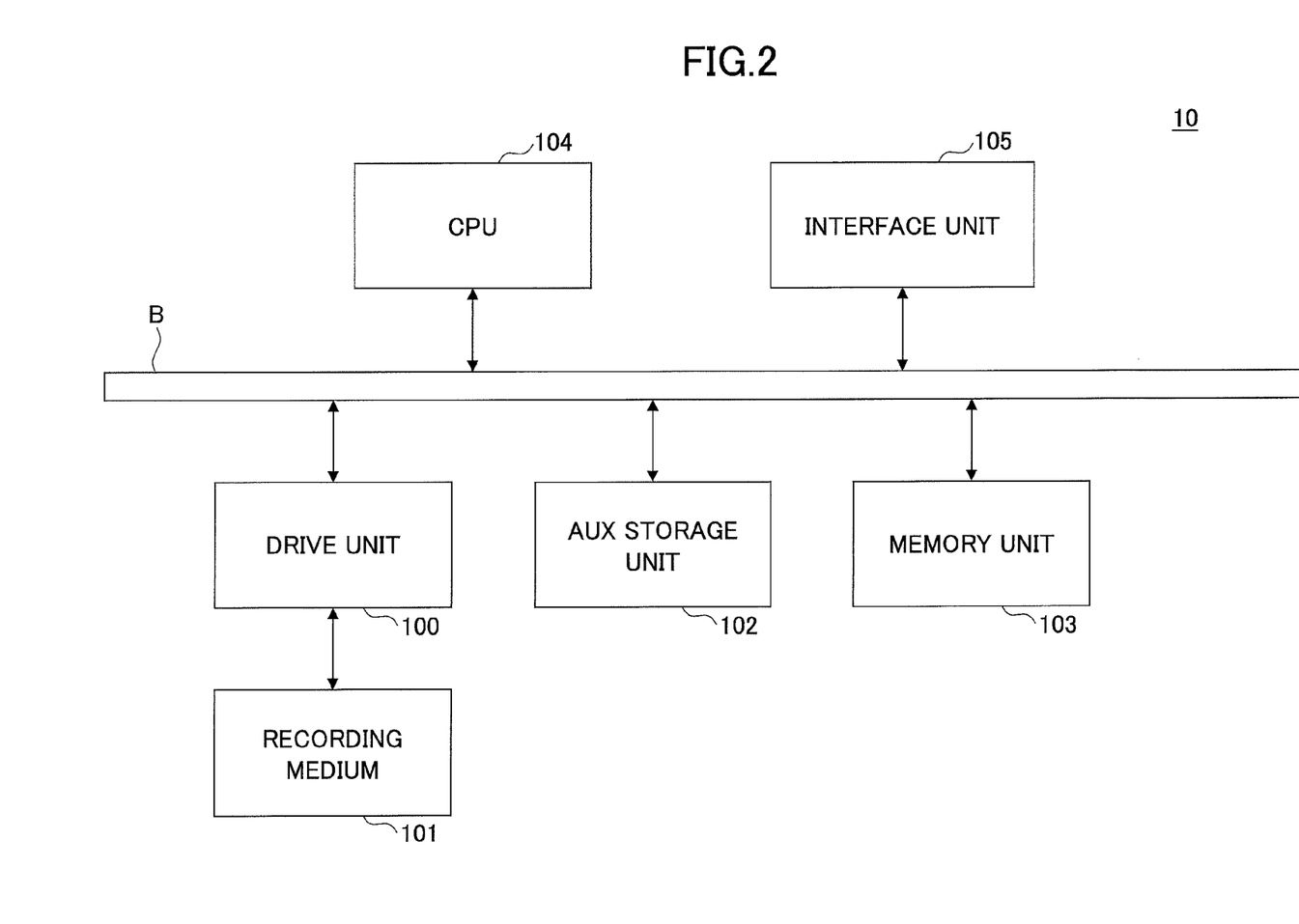
FIG. 2 is a block diagram illustrating an example of a hardware structure of a print server in the embodiment of the present invention.

FIG. 2 is a block diagram illustrating an example of a hardware structure of the print server 10 in this embodiment of the present invention. The print server 10 illustrated in FIG. 2 includes a drive unit 100, an auxiliary storage unit 102, a memory unit 103, a Central Processing Unit (CPU) 104, and an interface unit 105 that are connected via a bus B.

A program for causing a computer, that is, the CPU 104, to execute a process in the print server 10, may be stored in any suitable computer-readable storage medium that is formed by a recording medium 101 such as a Compact Disc-Read Only Memory (CD-ROM). When the recording medium 101 storing the program is set in the drive unit 100, the program is installed from the recording medium 101 to the auxiliary storage unit 102 via the drive unit 100. Of course, the installing of the program does not need to be made from the recording medium 101, and the program may be downloaded from another computer via the network. The auxiliary storage unit 102 stores the installed program, files that are necessary, data and the like.

The memory unit 103 reads the program from the auxiliary storage unit 102 and stores the program therein in response to a start instruction of the program. The CPU 104 executes functions of the print server 10 in accordance with the program stored in the memory unit 103. The interface unit 105 provides an interface for connecting the print server 10 to the network.

Figure 3:
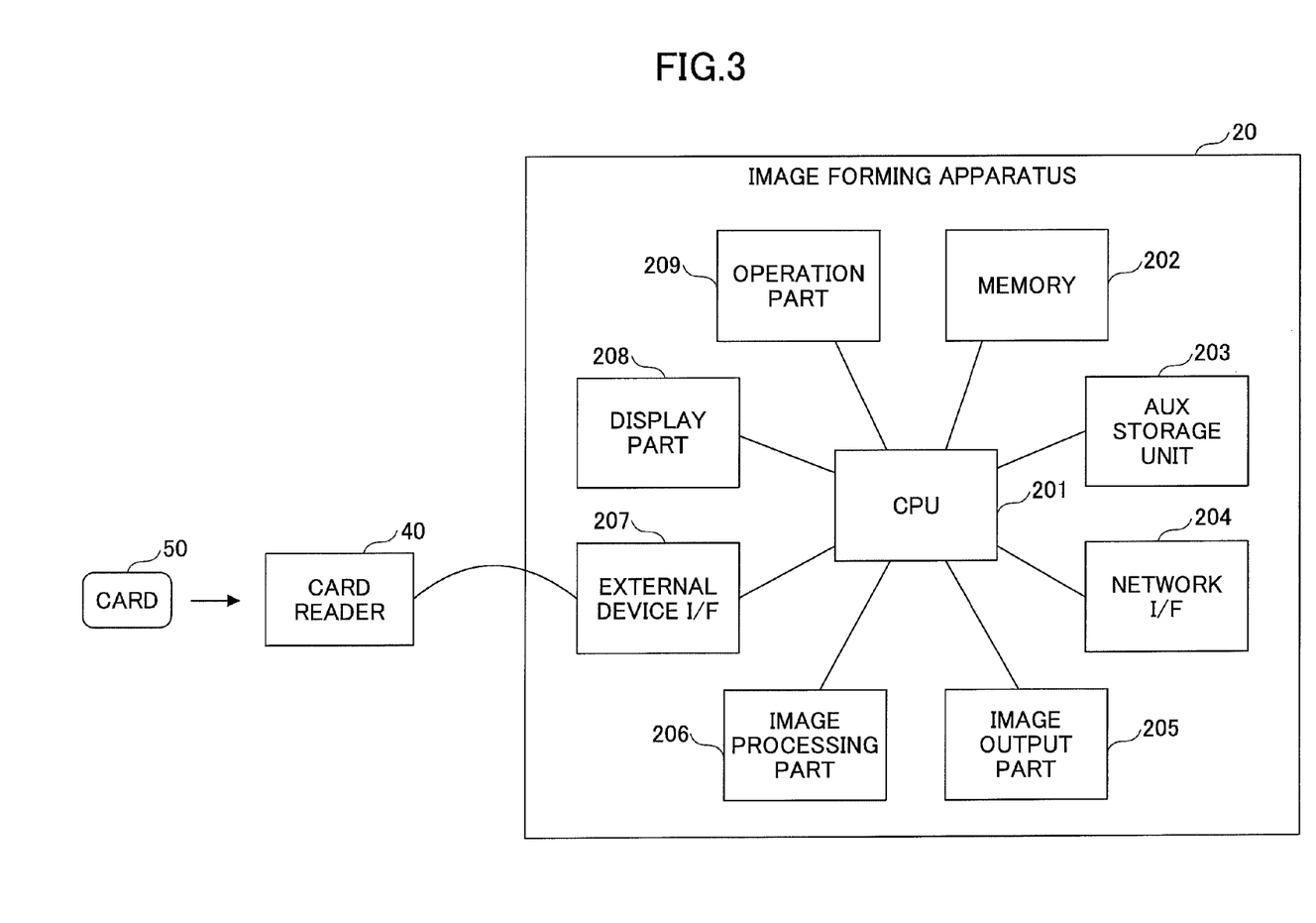
FIG. 3 is a block diagram illustrating an example of a hardware structure of an image forming apparatus in the embodiment of the present invention.

FIG. 3 is a block diagram illustrating an example of a hardware structure of the image forming apparatus 20 in this embodiment of the present invention. The image forming apparatus 20 illustrated in FIG. 3 includes a CPU 201, a memory 202, an auxiliary storage unit 203, a network interface (I/F) 204, an image output part 205, an image processing part 206, an external device interface (I/F) 207, a display part 208, and an operation part 209.

A program for realizing functions of the image forming apparatus 20 is stored (or installed) in the auxiliary storage unit 203 that is a nonvolatile storage unit such as a Hard Disk Drive (HDD). The auxiliary storage unit 203 stores the installed program, files that are necessary, data and the like. The memory 202 reads the program from the auxiliary storage unit 203 and stores the program therein in response to a start instruction of the program. The CPU 201 realizes functions of the image forming apparatus 20 in accordance with the program stored in the memory 202. The network I/F 204 provides an interface for connecting the image forming apparatus 20 to the network.

The display part 208 is formed by a Liquid Crystal Display (LCD) or the like, and displays operation screens, messages and the like. The operation part 209 includes hardware buttons (or keys) in order to accept inputs made by the user who operates the buttons. The display part 208 and the operation part 209 may be integrally formed as an operation panel.

The image processing part 206 executes various image processings that are required when outputting (or printing) the image data. The image output part 205 outputs (or prints) the image data.

The external device I/F 207 provides an interface for connecting the image forming apparatus 20 to a card reader 40 that is used to input the authentication information, and is formed by a Universal Serial Bus (USB) port (USB host interface), a serial port or the like, for example. The card reader 40 is formed by a cad reading unit configured to read information from a card 50, and includes a hardware interface (for example, a USB connector, a serial interface, etc.) connectable to the external device I/F 207. Of course, the card reader 40 may be provided within the image forming apparatus 20. In addition, the card reader 40 may be a contact type that reads the information by making physical contact with the card 50 or, a non-contact type that reads the information without making physical contact with the card 50. The card 50 is not limited to an Integrated Circuit (IC) card, and may be formed by any suitable card, such as a magnetic card, that is capable of recording a card ID (or card number) unique to each card 50. Generally, the card ID is referred to as a Universal ID or a Card Serial Number. Specific examples of the card 50 include a Proximity card, a Mifare card, a Java (registered trademark) Card, and the like.

In this embodiment, it is assumed for the sake of convenience that the card 50 is distributed to each user. Of course, a single card 50 may be shared by a plurality of users, depending on the security level that is required during operation. In addition, the card 50 distributed to each user is not limited to a single kind or type. As described above, the card reader 40 may be connected to the image forming apparatus 20 in a simple manner using the USB or the like. For this reason, it is possible to simultaneously connect a plurality of card readers 40 to the image forming apparatus 20 depending on the kinds or types (Proximity card, Mifare card, Java Card, etc.) of cards 50 to be used with the image forming apparatus 20. In other words, a plurality of kinds or types of cards 50 may be used simultaneously with respect to the image forming apparatus 20.

Figure 4:
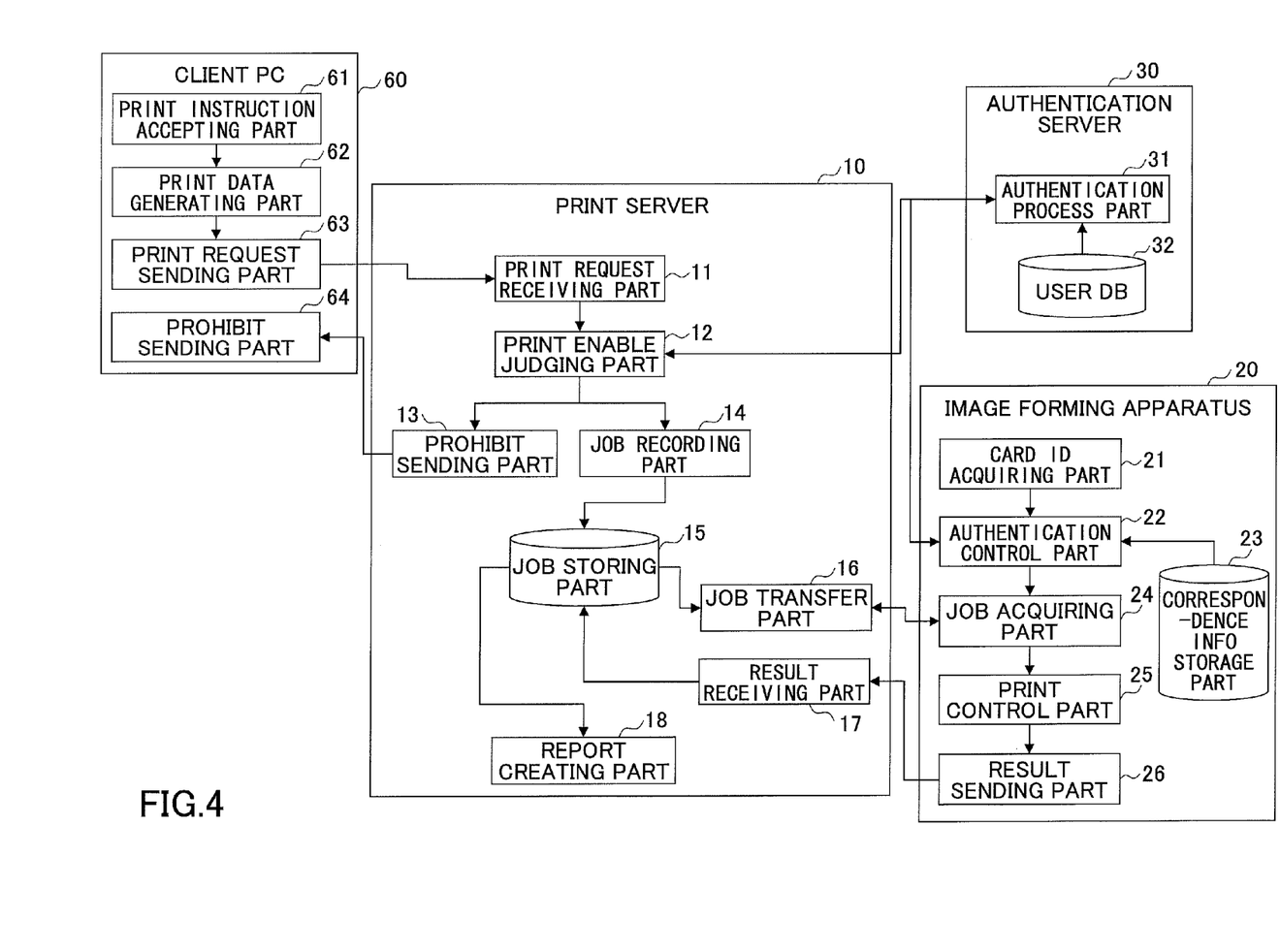
FIG. 4 is a block diagram illustrating an example of a functional structure of the printing system according to a first example of the embodiment of the present invention.

FIG. 4 is a block diagram illustrating an example of a functional structure of the printing system according to a first example of this embodiment of the present invention. The client PC 60 illustrated in FIG. 4 includes a print instruction accepting part 61, a print data generating part 62, a print request sending part 63, and a prohibit notifying part 64. The functions of the print instruction accepting part 61, the print data generating part 62, the print request sending part 63, and the prohibit notifying part 64 are basically realized by the program that is installed in the client PC 60 and causes the CPU of the client PC 60 execute processes corresponding to the functions.

The print instruction accepting part 61 accepts specifying of print target document data. In addition, the print instruction accepting part 61 causes the client PC 60 to display on a display part thereof a print setting screen on which print attribute information (also referred to as print conditions or print setting items) is set, and accepts setting of the print attribute information and input of the print instruction via the print setting screen. Furthermore, the print instruction accepting part 61 accepts input of the authentication information of the user via the print setting screen. The authentication information conforms to the authentication method used by the authentication server 30. In the first example of this embodiment, it is assumed for the sake of convenience that the authentication information includes the user name and the password.

The print data generating part 62 generates print data based on the print attribute information, with respect to the print target document data. The print data is written in a Page Description Language (PDL), and includes the print attribute information. In addition, the print data generating part 62 includes (or adds) the authentication information, the input of which is accepted by the print instruction accepting part 61, in the print data (or to the print data). The print request sending part 63 sends a print request including the print data to the print server 10. The prohibit notifying part 64 executes a process to notify the user that a printing in accordance with the print request is prohibited (or cannot be executed), based on the information that is sent from the print server 10 based on the print request.

The print instruction accepting part 61 and the print data generating part 62 may be formed by a printer driver, for example. The printer driver may be installed in the client PC 60 or, installed in another computer such as the print server 10. In the latter case where the printer driver is installed in another computer such as the print server 10, it is possible to utilize a printer sharing mechanism provided by an Operating System (OS).

The print server 10 includes a print request receiving part 11, a print enable judging part 12, a prohibit sending part 13, a job recording part 14, a job storing part 15, a job transfer part 16, a result receiving part 17, and a report creating part 18. The functions of the print request receiving part 11, the print enable judging part 12, the prohibit sending part 13, the job recording part 14, the job storing part 15, the job transfer part 16, the result receiving part 17, and the report creating part 18 are basically realized by the program that is installed in the print server 10 and causes the CPU 104 of the print server 10 to execute processes corresponding to the functions.

The print request receiving part 11 receives the print request sent from the client PC 60. The print enable judging part 12 judges whether to enable or prohibit the printing based on the authentication information extracted from the print data. More particularly, the print enable judging part 12 sends the authentication information to the authentication server 30, and causes the authentication server 30 to carry out an authentication process based on the authentication information. If the authentication process fails (or is unsuccessful), the print enable judging part 12 judges that the printing is prohibited. On the other hand, if the authentication process is successful, the print enable judging part 12 judges that the printing is enabled. The prohibit sending part 13 sends to the client PC 60 a judgement result of the print enable judging part 12 that judges that the printing is prohibited. The client PC 60 at the sending destination of the judgement result is judged based on identification information (Internet Protocol (IP) address or the like) included in an authentication request.

The job recording part 14 generates a job ID of a print job when the print enable judging part 12 judges that the printing is enabled, and records the print data included in the print request in the job storing part 15 in a manner related to the job ID. In addition, the job recording part 14 extracts a part or all of the print attribute information from the print data, and records the extracted information in the job storing part 15, as bibliographic information, in a manner related to the job ID. For example, the bibliographic information includes a user name, a printing type indicating whether a color printing or a monochrome printing is to be carried out, a number of prints to be made, and the like. The job storing part 15 forms a storage region for storing the print data, the bibliographic information and the like in the auxiliary storage unit 102.

The job transfer part 16 transfers the print data or the bibliographic information stored (or recorded) in the job storing part 15 to the image forming apparatus 20 in response to a request from the image forming apparatus 20. The result receiving part 17 receives a job execution result (for example, information indicating whether the job was successfully executed) from the image forming apparatus 20, and deletes the print data stored in the job storing part 15. The report creating part 18 generates (or tabulates) information (or report) indicating a state of use of the image forming apparatus 20 by each user, for example, based on the bibliographic information stored in the job storing part 15.

The image forming apparatus 20 includes a card ID acquiring part 21, an authentication control part 22, a correspondence information storage part 23, a job acquiring part 24, a print control part 25, and a result sending part 26. The functions of the card ID acquiring part 21, the authentication control part 22, the correspondence information storage part 23, the job acquiring part 24, the print control part 25, and the result sending part 26 are basically realized by the program that is installed in the image forming apparatus 20 and causes the CPU 201 of the image forming apparatus 20 to execute processes corresponding to the functions.

The card ID acquiring part 21 acquires from the card reader 40 the card ID that is read from the card 50 by the card reader 40. The authentication control part 22 acquires a user name and a pass word corresponding to the card ID from the correspondence information storage part 23, and causes the authentication server 30 to carry out an authentication based on the acquired user name and password. The correspondence information storage part 23 forms a storage region (for example, a table) for storing correspondence information indicating a correspondence between the card ID and the user name and password, in the auxiliary storage unit 203. The job acquiring part 24 acquires the print data or the bibliographical information acquired by the print server 10. The print control part 25 causes the image output part 205 to print the print data that is acquired by the job acquiring part 24. The result sending part 26 sends the job execution result to the print server 10.

The authentication server includes an authentication process part 31 and a user database (DB) 32. The functions of the authentication process part 31 and the user DB 32 are basically realized by the program that is installed in the authentication server 30 and causes the CPU of the authentication server 30 to execute processes corresponding to the functions. The authentication process part 31 carries out an authentication process using authentication information that is registered in advance in the user DB 32 for each user, in response to the authentication request from the print server 10 or the image forming apparatus 20. The user DB 32 is recorded (or registered) with the authentication information for each user. The user DB 32 may be recorded with attribute information of the user, in addition to the authentication information. For example, the user DB 32 may be recorded with authority information related to the functions of the image forming apparatus 20 for each user.

Figure 5:
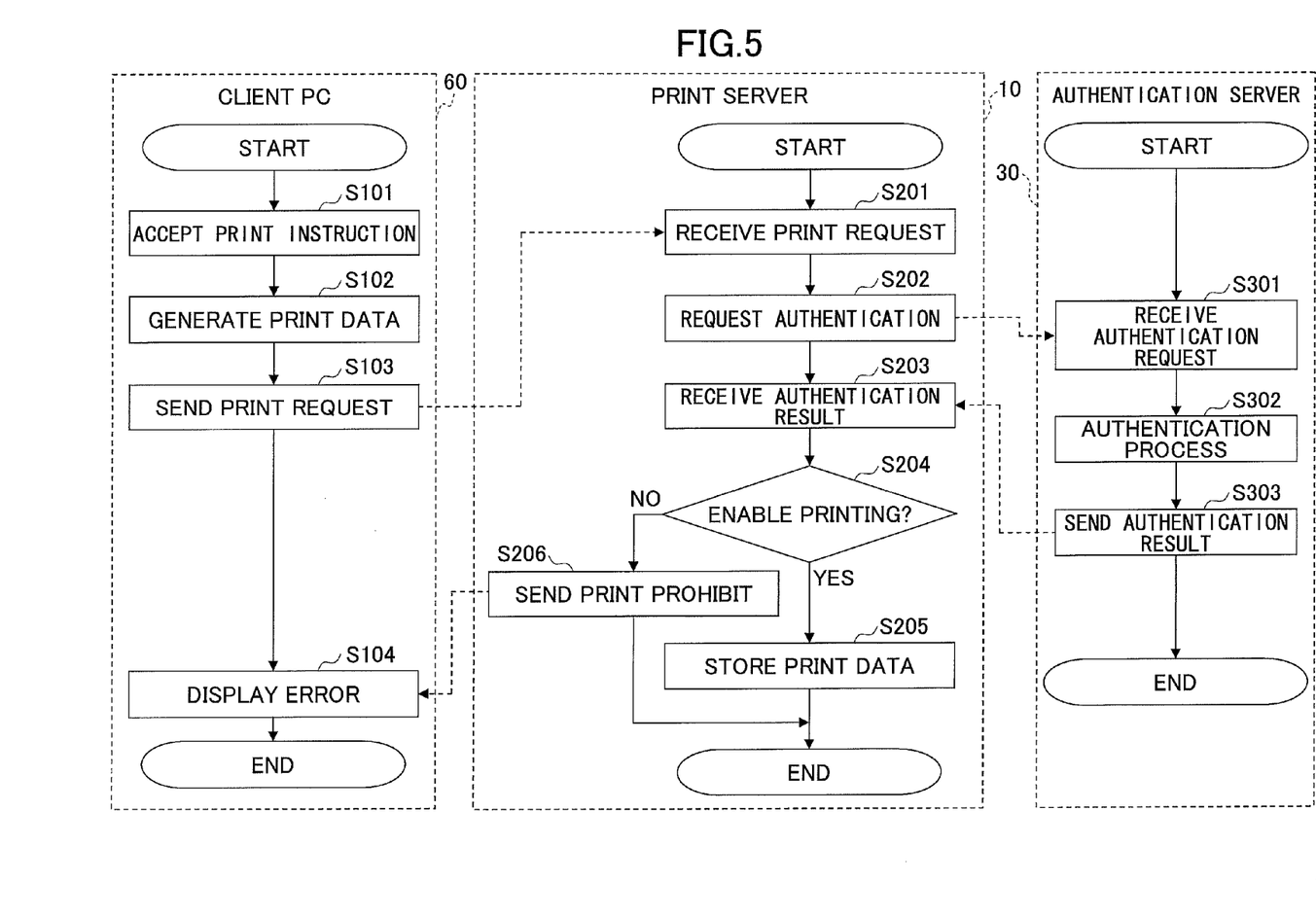
FIG. 5 is a flow chart for explaining a process at a time of storing a job.

Next, a description will be given of a processing sequence of the printing system 1, by referring to FIG. 5. FIG. 5 is a flow chart for explaining a process at a time of storing a job. In FIG. 5, the user operates the client PC 60.

In a step S101, the print instruction accepting part 61 accepts the selection of the document data that is the print target (or print target document data), and causes the display part of the client PC 60 to display the print setting screen. The print instruction accepting part 61 accepts input of the print attribute information and the authentication information (for example, the user name and password) via the print setting screen. Of course, the screen from which the print attribute information is input and the screen from which the authentication information is input may be separate screens. In other words, the print setting screen in the first example of this embodiment may be a set of a plurality of screens.

Figure 6:
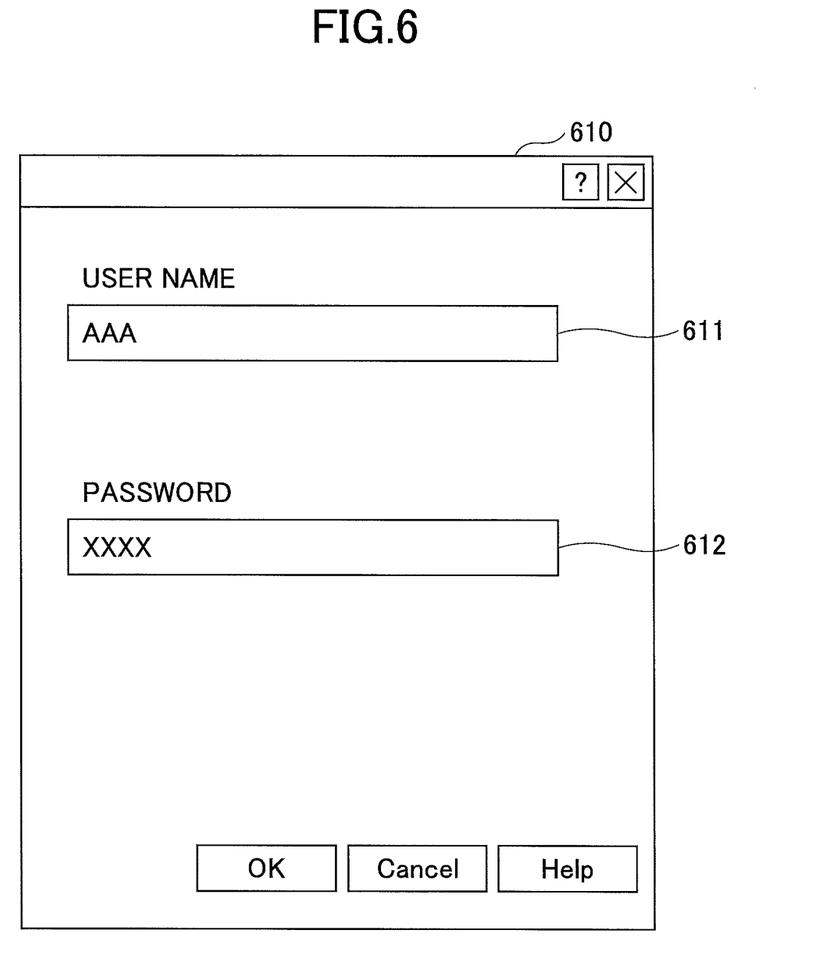
FIG. 6 is a diagram illustrating an example of an authentication information input screen forming a print setting screen.

FIG. 6 is a diagram illustrating an example of an authentication information input screen forming the print setting screen. In FIG. 6, an authentication information input screen 610 includes a user name input region 611 and a password input region 612. The print instruction accepting part 61 accepts the input of the user name and password via the authentication information input screen 610.

Next, in a step S102, the print data generating part 62 generates the print data of the print target document data according to the print attribute information, and records the input user name and password in the print data. In a step S103, the print request sending part 63 sends the print request including the generated print data to the print server 10. Identification information (for example, the IP address) of the print server 10 at the sending destination of the print data is recorded in advance in a storage unit of the client PC 60.

In a step S201, the print request receiving part 11 of the print server 10 receives the print request. In a step S202, the print enable judging part 12 extracts the authentication information from the print data included in the print request, and sends the authentication request including the extracted authentication information to the authentication server 30. Identification information (for example, the IP address) of the authentication server 30 at the destination of the authentication request is recorded in advance in the auxiliary storage unit 102.

In a step S301, the authentication process part 31 of the authentication server 30 receives the authentication request from the print server 10. In a step S302, the authentication process part 31 collates the authentication information included in the authentication request and the authentication information recorded in the user DB 32 for each user. Then, in a step S303, the authentication process part 31 returns the authentication result (information indicating whether the authentication was successful) to the print server 10.

In a step S203, the print enable judging part 12 of the print server 10 receives the authentication result from the authentication server 30. In a step S204, the print enable judging part 12 judges whether the printing is to be enabled based on the authentication result. If the authentication is successful and the judgement result in the step S204 is YES, the print enable judging part 12 inputs the judgement result (that is, information indicating that the authentication was successful and the printing is enabled) to the job recording part 14. In a step S205, the job recording part 14 generates the job ID according to the judgement result of the step S204, and records the print data in the job storing part 15 in a manner related to the job ID. In addition, the job recording part 14 extracts the print attribute information from the print data, and records the extracted print attribute information in the job storing part 15, as the bibliographical information of the job, in a manner related to the job ID.

On the other hand, if the authentication is unsuccessful and the judgement result in the step S204 is NO, the print enable judging part 12 inputs the judgement result (that is, information indicating that the authentication was unsuccessful and the printing is prohibited) to the prohibit sending part 13. In a step S206, the prohibit sending part 13 sends the judgement result indicating that the printing is prohibited to the client PC 60.

In a step S104, the prohibit notifying part 64 causes the display part of the client PC 60 to display an error message or the like indicating that the printing is prohibited, when the judgement result indicating that the printing is prohibited is received from the print server 10. Accordingly, the user may recognize that the printing is enabled or prohibited, when the print instruction is input from the client PC 60. As a result, it is possible to prevent an inconvenience such as the user moving to the location of the image forming apparatus 20 and thereafter recognizing that the printing is prohibited.

Furthermore, by avoiding storage of the print data or the like that is prohibited from being printed, it is possible to minimize unwanted or unnecessary usage of the storage region in the job storing part 15. In addition, it is possible to prevent an unauthorized person from inputting and storing unauthorized data in the job storing part 15.

In the first example of this embodiment, the print enable judging part 12 judges whether to enable the printing based only on the authentication result, but it is possible to take into consideration an existence of an authorization with respect to the print attribute indicated by the print attribute information when judging whether to enable the printing. In this case, in the step S303, if the authentication is successful, the authentication process part 31 of the print server 30 acquires from the user DB 32 authorization information of the user for whom the authentication was successful, and sends the authentication information together with the authentication result to the print server 10. The authorization information indicates an existence of authorization (or right to use) for each item (or function) corresponding to the print attribute information. The print enable judging part 12 compares the authorization information and the print attribute information, and judges that the printing is enabled if the user is authorized (that is, has the right) to use all print attributes (such as color printing) that are respectively specified as a utilizing target in the print attribute information. On the other hand, if the user is not authorized (that is has no right) to use all print attributes that are respectively specified as the utilizing target in the print attribute information, the print enable judging part 12 judges that the printing is prohibited even if the authentication is successful. The authorization information may be recorded in the auxiliary storage unit 203 of the print server 10.

As described above, by judging whether to enable the printing by taking into consideration the authorization (or right to use) with respect to the print attribute when storing the job, it is possible to avoid an inconvenience such as the user being unable to carry out the printing due to lack of authorization (or right to use) when operating the image forming apparatus 20.

After storing the job, the user moves to the location of a desired image forming apparatus 20. In other words, because the image forming apparatus 20 at the output destination (or print destination) is not specified when storing the job, the user may select any image forming apparatus 20 corresponding to the print server 10, that is convenient to the user, as the output destination.

Figure 7:
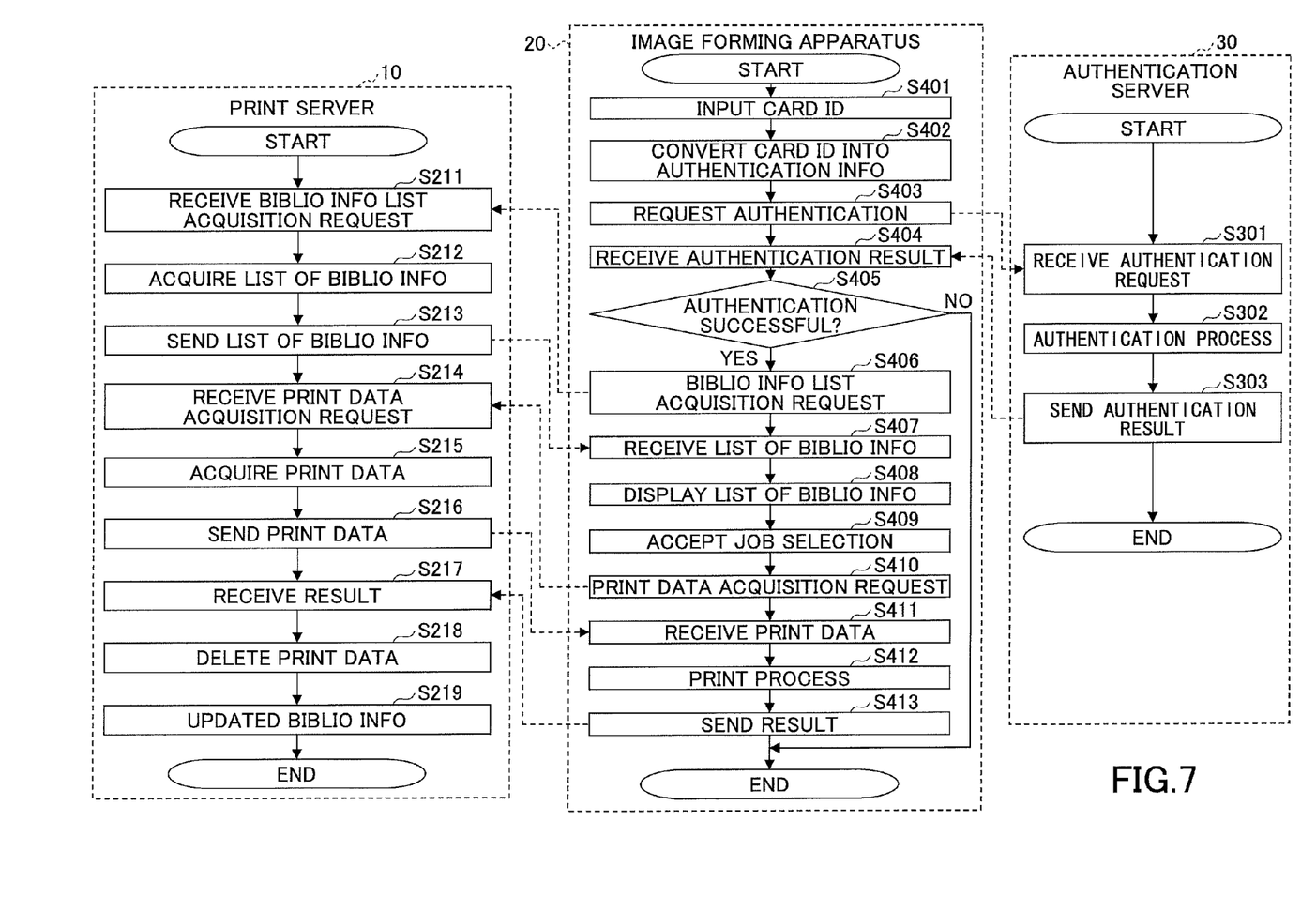
FIG. 7 is a flow chart for explaining a process at a time of executing a job.

Next, a description will be given of a processing sequence when executing a job after the user moves to the location of the desired image forming apparatus 20, by referring to FIG. 7. FIG. 7 is a flow chart for explaining the process at a time of executing the job. In FIG. 7, those steps that are the same as those corresponding steps in FIG. 5 are designated by the same reference numerals, and a description thereof will be omitted.

In order to make a log-in to the image forming apparatus 20, the user sets the card 50 into the card reader 40. In a step S401, the card ID acquiring part 21 of the image forming apparatus 20 acquires the card ID (hereinafter referred to as a "current card ID") that is read from the card 50 by the card reader 40, and records the current card ID in the memory 202. The setting of the card 50 into the card reader 40 refers to an operation of putting the card 50 in a state where the information recorded on the card 50 is readable by the card reader 40, including inserting the card 50 into the card reader 40, sliding the card 50 relative to the card reader 40, and holding the card 50 above the card reader 40.

Then, in a step S402, the authentication control part 22 converts the current card ID into the authentication information (for example, user name and password) of the user using correspondence information recorded in the correspondence information storage part 23.

Figure 8:
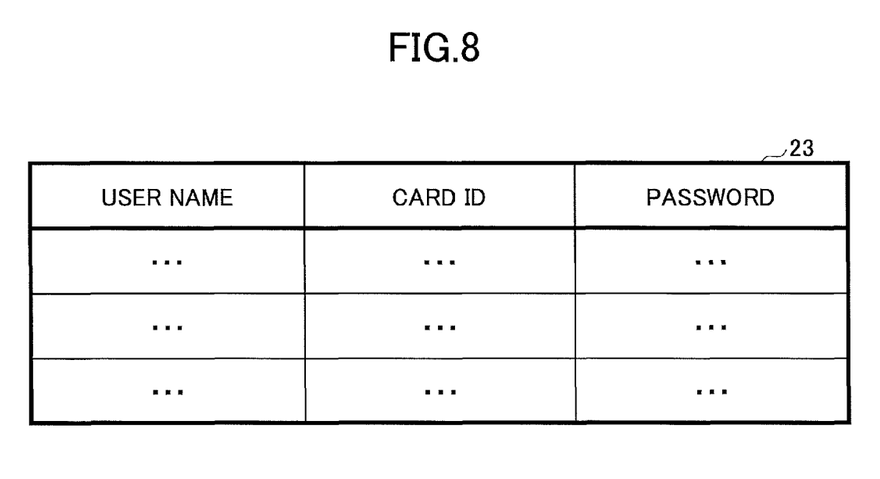
FIG. 8 is a diagram illustrating an example of correspondence information stored in a correspondence information storage part.

FIG. 8 is a diagram illustrating an example of the correspondence information stored in the correspondence information storage part 23. As illustrated in FIG. 8, the correspondence information storage part 23 is recorded with the user name, the card ID and the password, in correspondence with each other (that is, in a related manner), for each user. Hence, in the step S402, the authentication control part 22 converts the current card ID into the user name and password by acquiring the user name and password that are recorded in the correspondence information storage part 23 in correspondence with the current card ID.

Next, in a step S403, the authentication control part 22 sends the authentication request including the converted authentication information to the authentication server 30. The identification information (for example, the IP address) of the authentication server 30 that is the authentication request destination is recorded in advance in the auxiliary storage unit 203. In the steps S301 and S302, the authentication server 30 executes the authentication process similar to that described above in conjunction with FIG. 5 in response to the authentication request, and returns the authentication result to the image forming apparatus 20. The authentication for the log-in of the image forming apparatus 20 and the authentication to judge whether the printing is enabled in the print server 10 do not necessarily have to use the same authentication server 30. However, when the same authentication server 30 is used for these two authentications, it is possible to increase the possibility that both the authentication for the log-in of the image forming apparatus 20 and the authentication to judge whether the printing is enabled in the print server 10 will become successful. In other words, it is possible to improve the reliability of the judgement that judges whether the printing is enabled in the print server 10.

Next, in a step S404, the authentication control part 22 of the image forming apparatus 20 receives the authentication result. If the authentication is unsuccessful (that is, fails) and a judgement result in a step S405 is NO, the authentication control part 22 rejects the log-in, and in this case, the user cannot use the image forming apparatus 20. On the other hand, if the authentication is successful and the judgement result in the step S405 is YES, the authentication control part 22 permits the log-in so that the use can use the image forming apparatus 20. In a step S406, because the authentication was successful, the job acquiring part 24 specifies the user name of the user who made the log-in, and sends to the print server 10 an acquisition request for the bibliographical information of the job that is stored. The identification information (for example, the IP address) of the print server 10 at the job acquisition destination is registered in advance in the auxiliary storage unit 203. In addition, a plurality of print servers 10 may be registered so that all of the print servers 10 can be specified as the job acquisition destination or, so that the user can select the print server 10 that is to become the job acquisition destination from amongst the plurality of print servers 10.

When the job transfer part 16 of the print server 10 receives the acquisition request for the bibliographical information in a step S211, the job transfer part 16, in a step S212, acquires from the job storing part 15 a list of bibliographical information related to the user name that is specified in the acquisition request. The list may only have one entry of the bibliographical information. Then, the job transfer part 16 returns the list of bibliographical information that is acquired to the image forming apparatus 20, in a step S213. Each bibliographical information is added with a job ID that is related thereto.

When the job acquiring part 24 of the image forming apparatus 20 receives the list of bibliographical information in a step S407, and causes the received list to be displayed on the display part 208 in a step S408. When the user operates the operation part 209 and selects one or more print target jobs from the displayed list, the job acquiring part 24 accepts the selected print target job or jobs in a step S409. The job acquiring part 24 sends a print data acquisition request to the print server 10 by specifying the job ID of each selected print target job in a step S410.

The job transfer part 16 of the print server 10 receives the print data acquisition request from the image forming apparatus 20 in a step S214, and acquires the print data related to the job ID specified by the print data acquisition request from the job storing part 15 in a step S215. Then, the job transfer part 16 sends the acquired print data to the image forming apparatus 20 in a step S216.

In the image forming apparatus 20, when the job acquiring part 24 receives the print data from the print server 10 in a step S411, the print control part 25 causes (or controls) the image output part 205 to carry out a print process and print the print data in a step S412. When the print process is completed, the result sending part 26 specifies the job ID related to the print data that is printed by the print process, and sends a message indicating the completion of the print process (or a print complete message) to the print server 10 in a step S413.

When the print complete message is received by the result receiving part 17 of the print server 10 in a step S217, the result receiving part 17 deletes the print data corresponding to the job ID that is specified by the print complete message from the job storing part 15 in a step S218. By deleting the print data in response to the completion of the print process (or printing), it is possible to suppress an increase in the amount of the storage region used in the job storing part 15. Of course, the deletion of the print data may be carried out periodically. In this case, at the timing of the step S218, it is sufficient to add, to the print data, flag information indicating that the print data is a deletion target. When periodically deleting the print data, the print data added with the flag information is deleted.

Then, the print result receiving part 17 updates the bibliographic information corresponding to the job ID specified by the print complete message in a step S219. For example, the print result receiving part 17 adds date and time information indicating the time when the print process is carried out with respect to the bibliographical information.

Figure 9:
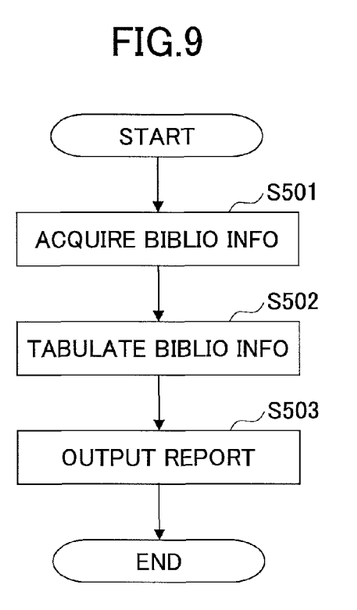
FIG. 9 is a flow chart for explaining a report output process.

Next, a description will be given of a report output process executed by the print server 10, by referring to FIG. 9. FIG. 9 is a flow chart for explaining the report output process. The report output process illustrated in FIG. 9 may be carried out when the report creating part 18 detects the arrival of a predetermined time, such as the beginning of a month, for example, or when a manager or the like inputs an instruction to carry out the report output process.

In a step S501 illustrated in FIG. 9, the report creating part 18 acquires the bibliographical information (for example, date and time of printing) of the print process that has been completed from the job storing part 16. Then, the report creating part 18 tabulates the bibliographical information of each job for each user, based on the user name included in each bibliographical information, in a step S502. Tabulating in this case refers to counting the number of color prints made and/or the number of monochrome (black-and-white) prints made, computing accounting information depending on each number of prints made, and the like. The accounting information may be computed by multiplying a preset unit price to each number of prints made.

Next, the report creating part 18 outputs a report by printing the tabulated results in a step S503. The printing of the tabulated results may be made by the image forming apparatus 20 or by another image forming apparatus or printer.

Figure 10:
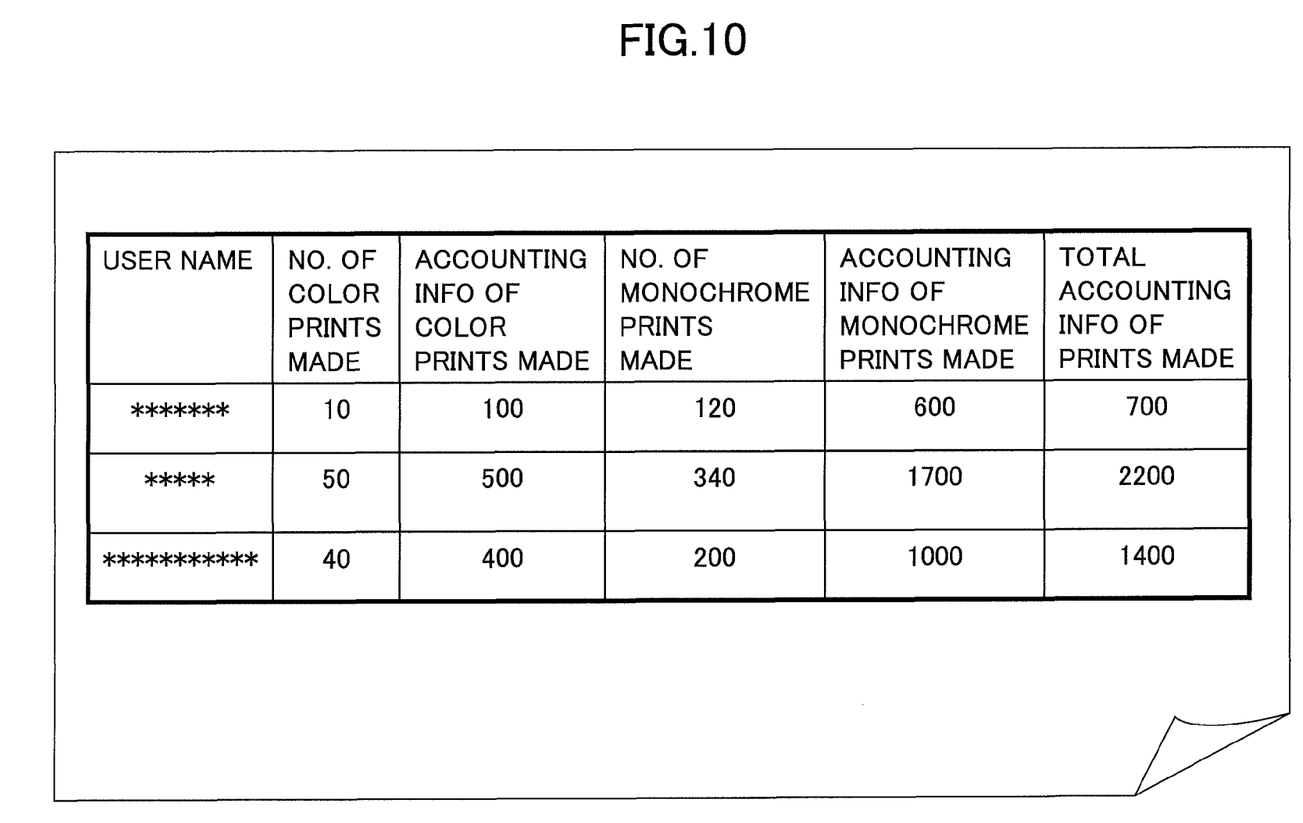
FIG. 10 is a diagram illustrating an example of a report.

FIG. 10 is a diagram illustrating an example of the report that is printed. In FIG. 10, the report includes, with respect to each user name, the number of color prints made, the accounting information (or price) of the color prints made, the number of monochrome prints made, the accounting information (or price) of monochrome prints made, and the total accounting information (or total price) of the prints made. The manager may comprehend the state of use of the image forming apparatus 20 by each user by referring to the report illustrated in FIG. 10. In addition, the report may be utilized to analyze running costs and the like. Of course, the format of the report is not limited to that illustrated in FIG. 10. For example, the bibliographical information recorded in the job storing part 15 may be output as a report without tabulating the bibliographical information. In this case, it is possible to comprehend a log of the jobs.

In a general system, an apparatus (for example, a computer) that creates the report must collect a job execution log from each image forming apparatus. On the other hand, in the first example of this embodiment, the report may be created by effectively utilizing the bibliographical information that is stored for the purpose of executing the job. In other words, the report may be created by utilizing a constituent element that is originally implemented to realize another function. Accordingly, it is unnecessary in the first example of this embodiment to implement a complex process for outputting the report. In addition, the single print server 10 stores the bibliographical information of the print jobs executed in a plurality of image forming apparatuses 20. For this reason, the report that is output from the print server 10 is in correspondence with the actual results of the jobs executed in the plurality of image forming apparatuses 20.

As described above, in the first example of this embodiment, the authentication is carried out based on the authentication information included in the print data when inputting the job, that is, when making the print request with respect to the print server 10, in order to judge whether the printing is to be enabled. In addition, the judgement result on whether the printing is to be enabled is notified to the client PC 60. Hence, the user may recognize whether the printing is enabled before moving to the location of the image forming apparatus.

It is assumed in the description given above that the authentication information input at the client PC 60 is included in the print data and sent to the print server 10. However, the print data and the authentication information may be transferred separately. For example, the authentication information may be sent first, and the print data may be transferred thereafter when the authentication is successful. In other words, the authentication information may be transferred at an arbitrary timing as long as the timing is before the job recording part 14 stores the print data and the like.

Figure 11:
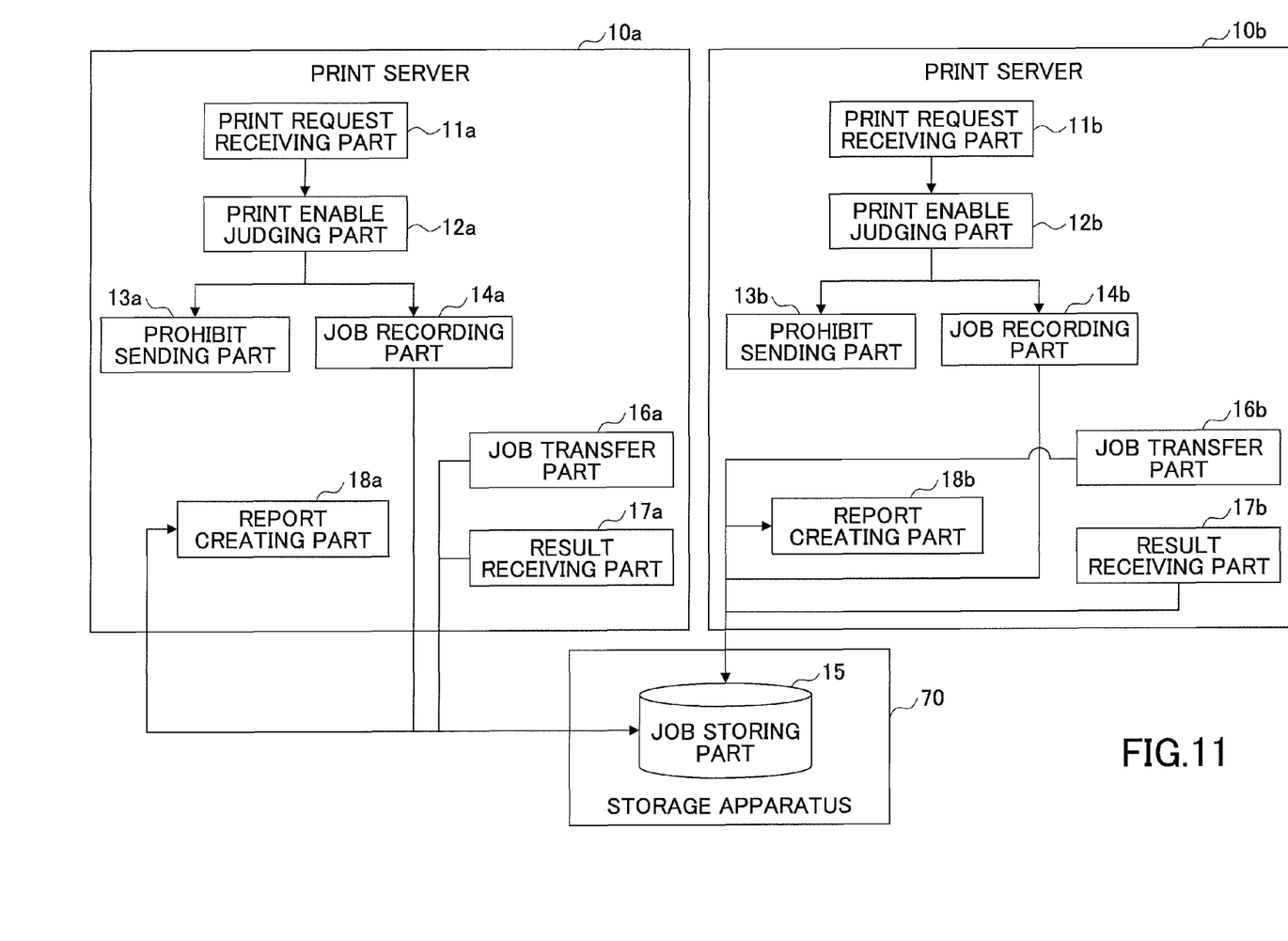
FIG. 11 is a block diagram illustrating an example of a functional structure of the printing server in a second example of the embodiment of the present invention.

Next, a description will be given of a second example of this embodiment of the present invention, by referring to FIG. 11. FIG. 11 is a block diagram illustrating an example of a functional structure of the print server in the second example of this embodiment of the present invention. In FIG. 11, those parts that are the same as those corresponding parts in FIG. 4 are designated by the same reference numerals, and a description thereof will be omitted.

In the second example of this embodiment, a plurality of print servers are provided. For the sake of convenience, FIG. 11 illustrates two print servers 10a and 10b. The constituent elements of the print server 10a are designated by the same reference numerals as those illustrated in FIG. 4 but with a suffix "a". The constituent elements of the print server 10b are designated by the same reference numerals as those illustrated in FIG. 4 but with a suffix "b". Each of the print servers 10a and 10b is not provided with a job storing part 15. Instead, a job storing part 15 is provided in a storage apparatus 70 that is connected to each of the print servers 10a and 10b via a network. In other words, the print servers 10a and 10b share the job storing part 15. Each of the print servers 10a and 10b is recorded in advance with the location (for example, the IP address, the Uniform Resource Locator (URL) or the like) of the job storing part 15 in the auxiliary storage unit 102.

Even in this case where the job storing part 15 is shared by a plurality of servers 10 (10a and 10b in this example), the processing sequence at the time of storing the job and the processing sequence at the time of executing the job are basically the same as the processing sequences described above in conjunction with FIGS. 5 and 7. In other words, the job recording part 14, the job transfer part 16, and the result receiving part 17 of each print server 10 accesses the job storing part 15 that is shared and is provided within the storage apparatus 70, instead of accessing the job storing part 15 therein. Otherwise, the processing sequence at the time of storing the job and the processing sequence at the time of executing the job are basically the same as the processing sequences described above.

According to the second example of this embodiment, even in a case where a plurality of print servers 10 need to be provided in order to satisfy load distribution needs or the like, the information (for example, the print data, the bibliographical information and the like) related to the job requested by each print server 10 is centrally managed by use of the shared job storing part 15 within the storage apparatus 70. For this reason, it is possible to avoid the image forming apparatus 20 that is selectable as the output destination from being restricted depending on the print server 10 at the input source of the job.

Further, the present invention is not limited to these embodiments, but various variations and modifications may be made without departing from the scope of the present invention.

What is claimed is:

1. An apparatus comprising:
a first receiving unit configured to receive data from an other apparatus;
a second receiving unit configured to receive, from the other apparatus, first user information to be associated with the data;
a storing unit configured to store, in a storage unit, the data received by the first receiving unit in a manner associated with the first user information received by the second receiving unit;
a judging unit configured to judge whether outputting the data is to be enabled based on the first user information and attribute information of the data;
a sending unit configured to send, to the other apparatus, a judgement result of the judging unit; and
an output unit configured to output the data stored in the storage unit in a manner associated with second user information that specifies the data based on the first user information.

2. The apparatus as claimed in claim 1, wherein
the second user information is authenticated in and received from an output apparatus, and
the output unit outputs the data associated with the second user information to the output apparatus.

3. The apparatus as claimed in claim 2, wherein
the other apparatus is formed by a client terminal,
the data includes print data,
the first user information includes user identification information,
the attribute information includes a printing type indicating whether a color printing or a monochrome printing is to be carried out, and a number prints to be made,
the output apparatus is formed by an image forming apparatus configured to print the print data in order to provide an output, and
the second user information includes authenticated user identification information.

4. The apparatus as claimed in claim 1, wherein
the storing unit stores the data associated with the first user information in the storage unit when the judgement result indicates that outputting the data is to be enabled, and does not store the data in the storage unit when the judgement result indicates that outputting the data is not to be enabled.

5. The apparatus as claimed in claim 1, wherein the judging unit judges whether outputting the data is to be enabled based further on third user information stored in an authentication apparatus.

6. The apparatus as claimed in claim 1, wherein
the judging unit judges whether outputting the data is to be enabled by judging whether the user of the first user information satisfies a condition to output the data, and
the data is generated according to the attribute information at the other apparatus.

7. The apparatus as claimed in claim 6, wherein the judging unit judges whether the user of the first user information satisfies a condition to output the data of the attribute information by judging whether the user is authorized to output the data having an attribute indicated by the attribute information.

8. A non-transitory computer-readable storage medium on which a program which, when executed by a computer of an apparatus, causes the computer to perform a process comprising:
first receiving data from an other apparatus;
second receiving, from the other apparatus, first user information to be associated with the data;
storing, in a storage unit, the data received by the first receiving in a manner associated with the first user information received by the second receiving;

judging whether outputting the data from the apparatus is to be enabled based on the first user information and attribute information of the data;

sending, to the other apparatus, a judgement result of the judging; and outputting the data stored in the storage unit in a manner associated with second user information that specifies the data based on the first user information.

9. The non-transitory computer-readable storage medium as claimed in claim 8, wherein the second user information is authenticated in and received from an output apparatus, and the outputting outputs the data associated with the second user information to the output apparatus.

10. The non-transitory computer-readable storage medium as claimed in claim 9, wherein the other apparatus is formed by a client terminal, the data includes print data, the first user information includes user identification information, the attribute information includes a printing type indicating whether a color printing or a monochrome printing is to be carried out, and a number of prints to be made, the output apparatus is formed by an image forming apparatus configured to print the print data in order to provide an output, and the second user information includes authenticated user identification information.

11. The non-transitory computer-readable storage medium as claimed in claim 8, wherein the storing stores the data associated with the first user information in the storage unit when the judgement result indicates that outputting the data is to be enabled, and does not store the data in the storage unit when the judgement result indicates that outputting the data is not to be enabled.

12. The non-transitory computer-readable storage medium as claimed in claim 11, wherein the judging judges whether the user of the first user information satisfies a condition to output the data of the attribute information by judging whether the user is authorized to output the data having an attribute indicated by the attribute information.

13. The non-transitory computer-readable storage medium as claimed in claim 8, wherein the judging judges whether outputting the data is to be enabled based further on third user information stored in an authentication apparatus.

14. The non-transitory computer-readable storage medium as claimed in claim 8, wherein the judging judges whether outputting the data is to be enabled by judging whether the user of the first user information satisfies a condition to output the data, and the data is generated according to the attribute information at the other apparatus.

15. An output system comprising:

a first apparatus which stores data received from a client terminal; and an output apparatus which outputs the data received from the first apparatus, wherein the first apparatus includes a first receiving unit configured to receive the data from the client terminal;

a second receiving unit configured to receive, from the client terminal, first user information to be associated with the data;

a storing unit configured to store, in a storage unit, the data received by the first receiving unit in a manner associated with the first user information received by the second receiving unit;

a judging unit configured to judge whether outputting the data from the first apparatus is to be enabled based on the first user information and attribute information of the data;

a sending unit configured to send, to the client terminal, a judgement result of the judging unit; and an output unit configured to output the data stored in the storage unit to the output apparatus in a manner associated with second user information that specifies the data based on the first user information, wherein the output apparatus authenticates the second user information and outputs the second user information to the output unit, and the output apparatus receives the data associated with the second user information from the output unit.

16. The output system as claimed in claim 15, wherein the storing unit stores the data associated with the first user information in the storage unit when the judgement result indicates that outputting the data is to be enabled, and does not store the data in the storage unit when the judgement result indicates that outputting the data is not to be enabled.

17. The output system as claimed in claim 15, wherein the judging unit judges whether outputting the data is to be enabled based further on third user information stored in an authentication apparatus.

18. The output system as claimed in claim 15, wherein the judging unit judges whether outputting the data is to be enabled by judging whether the user of the first user information satisfies a condition to output the data, and the data is generated according to the attribute information at the client terminal.

19. The output system as claimed in claim 16, wherein the data includes print data, the first user information includes user identification information, the attribute information includes a printing type indicating whether a color printing or a monochrome printing is to be carried out, and a number prints to be made, the output apparatus is formed by an image forming apparatus configured to print the print data in order to provide an output, and the second user information includes authenticated user identification information.

20. The output system as claimed in claim 18, wherein the judging unit judges whether the user of the first user information satisfies a condition to output the data of the attribute information by judging whether the user is authorized to output the data having an attribute indicated by the attribute information.

\* \* \* \* \*